United States Patent [19]
Belden

[11] Patent Number: 5,783,067
[45] Date of Patent: *Jul. 21, 1998

[54] ELONGATED FILTER SYSTEM, FILTER ELEMENT THEREFOR AND METHODS OF MAKING SAME

[75] Inventor: Donald E. Belden, Sand Springs, Okla.

[73] Assignee: Facet International, Inc., Tulsa, Okla.

[*] Notice: The term of this patent shall not extend beyond the expiration date of Pat. No. 5.587.071.

[21] Appl. No.: 591,751

[22] Filed: Jan. 25, 1996

Related U.S. Application Data

[60] Continuation-in-part of Ser. No. 488,877, Jun. 9, 1995, Pat. No. 5,587,071, which is a division of Ser. No. 58,768, Apr. 13, 1993, Pat. No. 5,423,984.

[51] Int. Cl.⁶ .......................... B01D 29/21; B01D 27/08; B01D 27/06; B01D 35/30
[52] U.S. Cl. .......................... 210/232; 210/437; 210/457; 210/493.1; 55/498; 55/510
[58] Field of Search .......................... 210/232, 238, 210/282, 450, 453, 457, 493.1, 493.2, 497.01, 437; 55/498, 510

[56] References Cited

U.S. PATENT DOCUMENTS

| | | |
|---|---|---|
| 2,364,240 | 12/1944 | Parry . |
| 2,732,031 | 1/1956 | Rabbitt et al. . |
| 2,771,156 | 11/1956 | Kasten et al. . |
| 2,843,269 | 7/1958 | Dudinec . |
| 2,846,074 | 8/1958 | Brundage . |
| 2,884,135 | 4/1959 | Nowak . |
| 2,891,673 | 6/1959 | Zievers . |
| 3,106,528 | 10/1963 | Burks . |
| 3,239,062 | 3/1966 | Rosaen . |
| 3,494,114 | 2/1970 | Nelson . |
| 3,786,926 | 1/1974 | Wilhelm . |
| 3,906,724 | 9/1975 | Yoshizaki . |
| 4,061,576 | 12/1977 | Hilgert . |
| 4,170,556 | 10/1979 | Pall . |
| 4,810,379 | 3/1989 | Barrington . |
| 5,013,438 | 5/1991 | Smith . |
| 5,141,637 | 8/1992 | Reed . |
| 5,298,160 | 3/1994 | Ayers . |
| 5,423,984 | 6/1995 | Belden . |
| 5,587,071 | 12/1996 | Belden . |

FOREIGN PATENT DOCUMENTS 893085   4/1962   United Kingdom .

Primary Examiner—Thomas M. Lithgow
Attorney, Agent, or Firm—Joseph V. Tassone

[57] ABSTRACT

An elongated filter system is provided which comprises an elongated filter alignment structure, a filter attachment structure and an elongated filter. The elongated filter attachment structure is removably attached to the filter alignment structure. The elongated filter alignment structure has a structure on one end to secure the elongated filter thereupon in fluid communication with a fluid passageway disposed in the filter attachment structure. The filter attachment structure for attaching the elongated filter comprises a yoke having an outer peripheral area in sealing engagement with the filter. The elongated filter alignment structure may comprise a central rod attached to a central opening in the filter attachment structure and may further have an elongated apertured center tube assembly disposed upon the rod. The elongated apertured center tube may be comprised of at least two interlocking tube sections and may further have multiple interlocking tube sections joined in an end to end relationship by connecting members each having a central opening in a central hub with the central openings being aligned with the central rod.

6 Claims, 5 Drawing Sheets

ELONGATED FILTER SYSTEM, FILTER ELEMENT THEREFOR AND METHODS OF MAKING SAME

CROSS REFERENCE TO RELATED APPLICATIONS

This application is a continuation-in-part patent application of its co-pending parent patent application, Ser. No. 488,877, filed Jun. 9, 1995, (now U.S. Pat. No. 5,587,071) which, in turn, is a divisional patent application of its co-pending parent patent application, Ser. No. 058,768, filed Apr. 13, 1993, now U.S. Pat. No. 5,423,984.

BACKGROUND OF THE INVENTION

1. Field of the Invention

The present invention relates to an elongated filter system, the elongated filter system having an elongated alignment means associated therewith, filter element assemblies for the elongated filter system, wherein the filter element assemblies are constructed solely of combustible materials thus allowing the filter element assemblies to be completely incinerable. One of the filter element assemblies is constructed without a center supporting tube and another of the filter element assemblies is constructed utilizing a center supporting tube, end pieces and filter element all constructed solely of combustible material.

2. Description of the Related Art

In industrial or automotive filtering applications, the material which is to be filtered often contains contaminants which must be removed and disposed of as hazardous waste. One of the acceptable ways of disposing of many types of hazardous waste is incineration performed by a licensed hazardous waste disposal facility.

One problem which previous filter systems present is that the filter element onto which the contaminates adhere has generally contained a metal or other rigid, non-combustible center support member. Therefore, it is known to manufacture a filter element having a rigid center support tube. For instance, see U.S. Pat. No. 3,786,926 issued on Jan. 22, 1974 to John R. Wilhelm, or U.S. Pat. No. 2,843,269 issued on May 16, 1955 to Emery Dudinec. In order to incinerate these filter elements, the support member must either be manually removed from the filter element prior to the incineration and then separately disposed of as hazardous waste or, alternately, the entire filter element must be shredded prior to incineration.

It is also known to make a pleated paper filter element having the ends thereof captured in a thermoplastic material, such material being commonly known as "Plastisol". For instance, see U.S. Pat. No. 2,732,031 issued on Jan. 24, 1956 to Milton Rabbitt and Carl Binder; U.S. Pat. No. 2,771,156 issued on Nov. 20, 1956 to Walter Kasten and Abbott Rohn; and U.S. Pat. No. 3,106,528 issued on Oct. 8, 1963 to Roland Burks.

Removal of the center support member prior to incineration presents safety problems to the workers performing the removal, adds to the cost of disposal, and increases the risk of liability to the company generating the waste. This increase in risk of liability is due to the fact that the removed support members are considered hazardous waste which must be disposed of in a licensed hazardous waste landfill. As a contributor to a hazardous waste landfill which may sometime be declared a Superfund site, the generating company, the disposal company and any transporting company which was employed to deliver the support members to the landfill, may all face future liability for the disposal. Thus, both the generating company and the disposal company would prefer to avoid this option since under current hazardous disposable waste laws, they remain liable for their hazardous waste from 'cradle-to-grave'.

On the other hand, in order for the entire filter element to be incinerated, a disposal facility must first be located which has the capacity of shredding materials prior to incineration. Second, since the non-combustible elements of the filter element will pass through the hazardous waste incinerator and will exit as solid waste which is normally disposed of as hazardous waste in a hazardous waste landfill, the generating company retains the potential Superfund liability with this option also. This is true, despite the fact that the material is not hazardous waste, since all contributors to a landfill which later becomes a Superfund site are liable for ensuing cleanup costs regardless of the types of materials they contributed. For these reasons, shredding and incinerating the entire filter elements is also an unattractive option.

The only other viable option available for disposal of most filter elements is to bury the entire filter element in a hazardous waste landfill. This option is costly and increases the risk of Superfund liability since the containers in which the filter elements are sealed for burial will eventually be breached by the soil's natural chemical processes, thus, releasing the contaminants into the soil and, as described above, the contributor is still liable for cleanup costs. Under Title D of the Federal Code of Regulations, this liability extends to thirty years after the disposal site is closed. Thus, to avoid potential liability, it is desirable to have completely incinerable filters.

In the making of elongated filtering systems, such as used in the filtering of aviation fuels, the disposal problem becomes particularly acute because of the extended length of the filtering elements. An equally difficult problem with elongated filtering elements arises in the installation and removal of the elements from the filtering chamber. Due to the extended length, alignment of the filter elements with the outlet port proceeds slowly sometimes requiring rigorous and/or sophisticated means of assuring alignment.

Therefore, it is known to make a filter device having a filter element carried by an inner housing in axial alignment with a rod axially aligned with a chamber of the filter device. For instance, see U.S. Pat. No. 3,239,062 issued on Mar. 8, 1966 to Nils Rosaen.

It is also known to provide an elongated, one-piece center tube assembly having expanded end portions with fine screen means disposed around an intermediate portion wherein the center tube assembly supports a soft filter cartridge comprised of a fabric bag filled with pulverulent filter medium. For instance, see U.S. Pat. No. 2,846,074 issued on Aug. 5, 1958 to Alan Brundage.

Finally, it is known to provide an elongated, removable tubular filter liner which is disposed longitudinally in the interior of an elongated filter element comprising a tubular wall wherein the tubular wall further has a guide means for urging the annular end portions of the liner into embracing relationship with the interior surface of the wall. For instance, see U.S. Pat. No. 2,891,673 issued on Jun. 23, 1959 to James Zievers.

The present invention addresses this problem by providing a filter system having a permanent center tube assembly onto which fully incinerable filter elements may be replaceably attached or by providing a filter having a center tube support, end caps and filter element all of which are capable of being reduced significantly in volume by crushing and are fully incinerable.

SUMMARY OF THE INVENTION

The present invention briefly is a filter system having an elongated hollow apertured filter tube assembly around which fully incinerable filter element assemblies may be removably secured. Alternately, the elongated apertured center tube assembly may be secured to the filtering means and is adapted to be removable therewith, both the elongated apertured center tube assembly and the filtering means being constructed of materials which are fully incinerable. The center tube assembly may be composed of one or more interlocking tube sections which are attached to each other in an end-to-end relationship by means of at least one intermediate connecting member. Each of the interlocking tube sections is composed of an interlocking upper female tube and a corresponding lower male tube. A bottom end of the tube assembly abuts a filter attachment means and is held in vertical alignment therewith by means of a central rod which is secured to the filter attachment means and extends upwardly therefrom, passing sequentially through openings provided in a bottom flange member located at the bottom end of the center tube assembly, a hub portion provided on each intermediate connecting member of center tube assembly which comprises more than one interlocking tube section. A yoke, provided with a central opening through which the threaded portion of the rod passes, is secured to the filter system by tightening a nut onto the threaded portion of the rod so that the nut tightens against washers which abut the yoke. As the nut is tightened, a compressible bottom sealing gasket provided on a bottom end of the filter element assembly seals the filter element assembly to the filter attachment means and a compressible top sealing gasket provided on a top end of the filter element assembly seals the filter element assembly to the yoke.

Where the filter element assembly having no center support tube is utilized, a top flange member is located at a top end of the center tube assembly and a jam nut is provided which tightens onto a threaded portion provided on a top end of the rod, abutting the top flange member in order to secure the center tube assembly to the filter attachment means. The filter element assembly is then slid down around the center tube assembly and the yoke is secured atop the assembly as described above.

In use, a medium to be filtered passes inwardly through a pleated filter medium provided on the filter element assembly, through the apertured centered tube assembly, then downwardly through the opening in the bottom flange member which communicates with a fluid passageway provided in the filter attachment means as a means for the filtered medium to exit the filter system.

It is an object of this invention to provide an elongated filter system comprising an elongated filter alignment means, a filter attachment means and an elongated filter, the elongated filter attachment means removably attached to the filter alignment means, the elongated filter alignment means having means on one end to secure the elongated filter thereupon in fluid communication with a fluid passageway disposed in the filter attachment means, the filter attachment means for attaching the elongated filter comprising a yoke having an outer peripheral area adapted to be in sealing engagement with the filter.

It is another object of this invention to provide an elongated filter system wherein the elongated filter alignment means comprises a central rod attached to a central opening in a filter attachment means.

It is still another object of this invention to provide an elongated filter system wherein the elongated filter alignment means comprises an elongated apertured center tube assembly having a central opening in a central hub of at least one of a series of interlocking tube sections, each of the central openings being aligned with a central rod attached to a central opening in a filter attachment means.

It is still another object of this invention to provide an elongated filter system having an elongated apertured center tube assembly with a filtering means disposed thereabout.

It is yet another object of this invention to provide an elongated filter means that is removably disposed about an elongated apertured center tube assembly.

It is yet still another object of this invention to provide an elongated filter disposed about an elongated apertured center tube assembly and secured thereto and is removable therewith.

It is a further object of this invention to provide an elongated filter system having an elongated filter alignment means comprising an elongated apertured center tube assembly disposed about and secured to a central rod attached to a central opening in the filter attachment means.

Other objects, uses and advantages of this invention are apparent from a reading of this description which proceeds with reference to the accompanying drawings forming a part thereof and wherein:

DETAILED DESCRIPTION OF THE PREFERRED EMBODIMENTS

Figure 1:
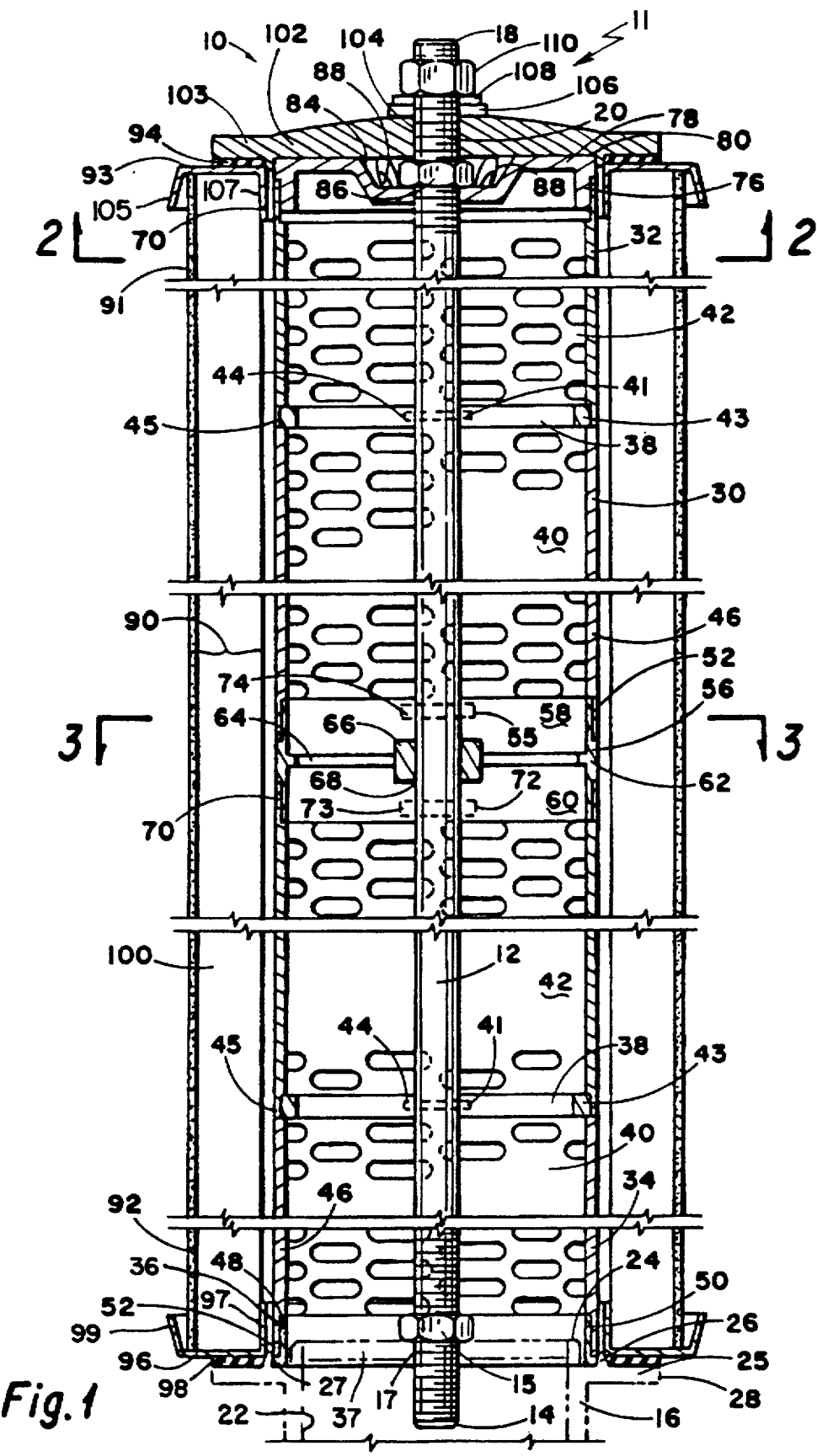
FIG. 1 is a front elevation of a filter system constructed according to a preferred embodiment of the present invention.

Referring now to the drawings and initially to FIG. 1, there is illustrated an elongated filter system 10 constructed according to a preferred embodiment of the present invention.

The elongated filter system 10 is provided with a first elongated filter alignment means 11 comprising a vertically oriented central rod 12, having a bottom end 14, which is attached by means of a nut 15 or otherwise to a filter attachment means 16, and a top end 18 provided with a threaded portion 20. Filter attachment means 16 is provided with a fluid passageway 22 therethrough. An upwardly oriented inner retaining lip 24 is provided concentrically with central rod 12 and around fluid passageway 22. Filter attachment means 16 is provided with an horizontally oriented ledge 25 circumferentially attached and extending outwardly from inner retaining lip 24. An upwardly oriented outer retaining lip 26 is provided on ledge 25 of filter attachment means 16 so that outer retaining lip 26 is spaced radially outwardly from inner retaining lip 24 and is spaced radially inwardly from an outer edge 28 of ledge 25. An annular recess 27 is formed between inner retaining lip 24 and outer retaining lip 26.

In the preferred embodiment, an elongated apertured center tube assembly 30, having a top end portion 32 and a bottom end portion 34, attaches by means of a bottom flange member 36 provided on the bottom end portion 34 of the center tube assembly 30 to the filter attachment means 16 so that the center tube lower end 46, having bottom flange member 36 disposed therein, rests in annular recess 27. Bottom flange member 36 is provided with a central opening 37 which allows fluid communication between the center tube assembly 30 and the fluid passageway 22 of the filter attachment means 16.

The center tube assembly 30 is composed of at least one interlocking tube section 38. Each interlocking tube section 38 is comprised of a lower male tube 40 and an upper female tube 42. The filter system 10 of FIG. 1 employs at least two interlocking tube sections 38, but as illustrated by the broken lines bisecting the filter system 10, the present invention also includes filter systems 10 employing only one or more than two interlocking tube sections 38. Tubes 40 and 42 are held together by means of ears 41 provided on an upper end 43 of each of lower male tubes 40 that engage corresponding openings 44 provided in a lower end 45 of each of the female tubes 42.

Figure 6:
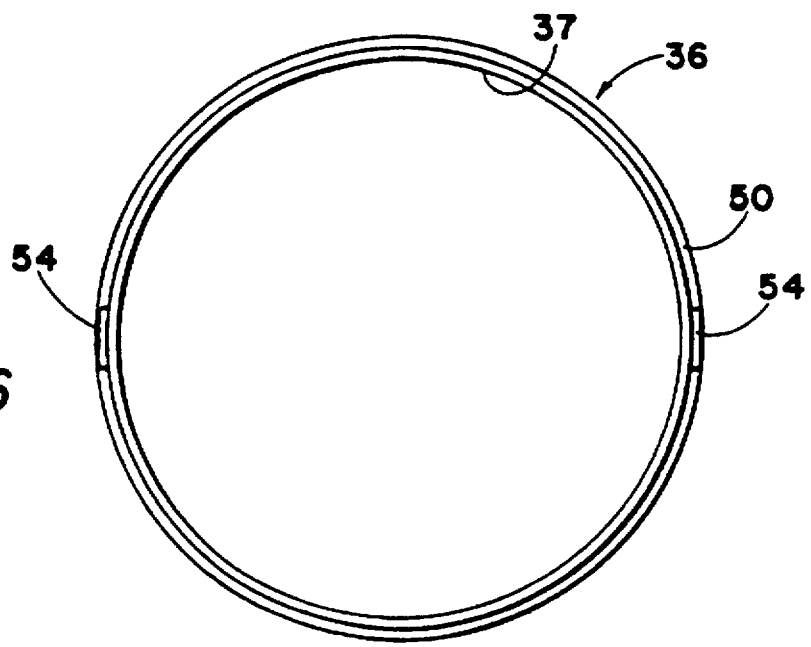
FIG. 6 is a top plan view of the bottom flange of FIG. 5.
Figure 5:
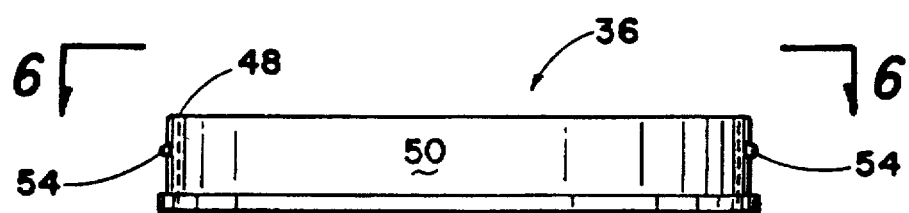
FIG. 5 is a front elevation of a bottom flange removed from the filter system of FIG. 1.

Each of male tubes 40 is provided with a lower end 46. Lower end 46 of the lowermost male tube 40 serves as bottom end 34 of center tube assembly 30 and, as such, secures to an upper end 48 of bottom flange member 36. As best seen in FIGS. 1, 5 and 6, the upper end 48 of bottom flange member 36 is provided with an upwardly oriented section 50 of decreased external diameter, and lower end 46 of lower male tube 40 is provided with a downwardly oriented section 52 of increased internal diameter so that upwardly oriented section 50 telescopically receives downwardly oriented section 52. Upwardly oriented section 50 is provided with ears 54, shown in FIGS. 5 and 6, that engage corresponding openings 55, visible in the upper most tube section 38 in FIG. 1, provided in downwardly oriented section 52 in order to secure bottom end 34 of central tube assembly 30 to bottom flange member 36.

Figure 3:
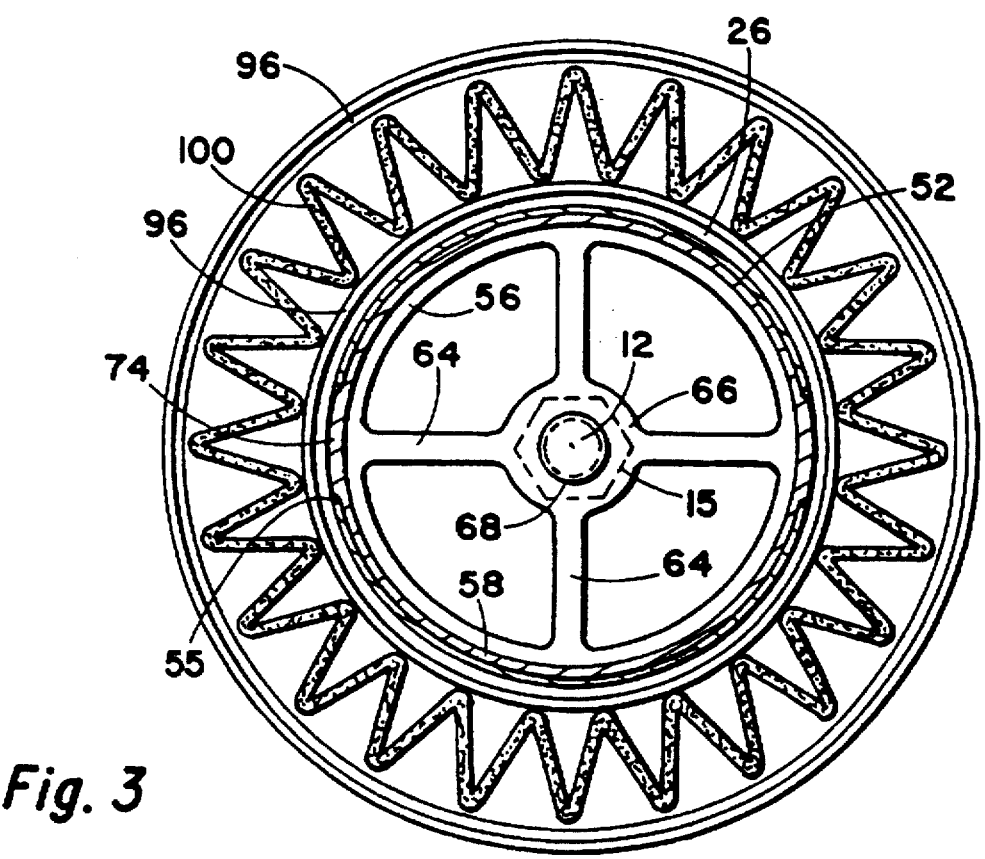
FIG. 3 is a cross-sectional view taken along line 3—3 of FIG. 1.

As illustrated in FIG. 1, two or more tube sections 38 can be attached in an end-to-end relationship to make elongated center tube assembly 30 by employing intermediate connecting members 56 between each of tube sections 38. Each of intermediate connecting members 56 has an upwardly oriented upper end 58, a downwardly oriented lower end 60, and a middle portion 62 located between two ends 58 and 60. Collectively, ends 58 and 60 and middle portion 62 comprise a circumferential flange portion of each of intermediate connecting members 56. Referring also to FIG. 3, middle portion 62 is provided with spokes 64 oriented inwardly and attached centrally to a central hub 66. Each central hub 66 is provided with an opening 68 therethrough for receiving rod 12 aligning each of middle portions 62 in concentric relationship with rod 12.

Each of lower ends 60 is decreased in external diameter, and an upper end 70 provided on each of female tubes 42 is increased in internal diameter so that lower ends 60 are telescopically received by upper ends 70 of the interlocking tube section 38 located immediately below. Each of upper ends 70 is provided with openings 72 for receiving corresponding ears 73 provided on each of lower ends 60 to secure intermediate connecting member 56 to the tube section 38 located immediately below the respective intermediate connecting member 56.

Likewise, each of upper ends 58 is decreased in external diameter so that upper ends 58 telescopically receive downwardly oriented sections 52 provided on lower ends 46 of male tube 40 in the tube section 38 located immediately above. Similarly, each of the upper ends 58 is provided with ears 74 that engage openings 55 provided in downwardly oriented section 52 of male tube 40 of the tube section 38 located immediately above in order to secure together intermediate connecting member 56 and the tube section 38.

Upper end 70 of the female tube 42 located in the upper most tube section 38 of filter system 10 is telescopically received by a lower end 76 having a reduced external diameter which is provided on a top flange member 78. Top flange member 78 is removably secured to center tube assembly 30 and, therefore, top flange member 78 does not have any ears for engaging openings 72 provided on upper end 70 of female tube 42 in the uppermost tube section 38.

Figure 2:
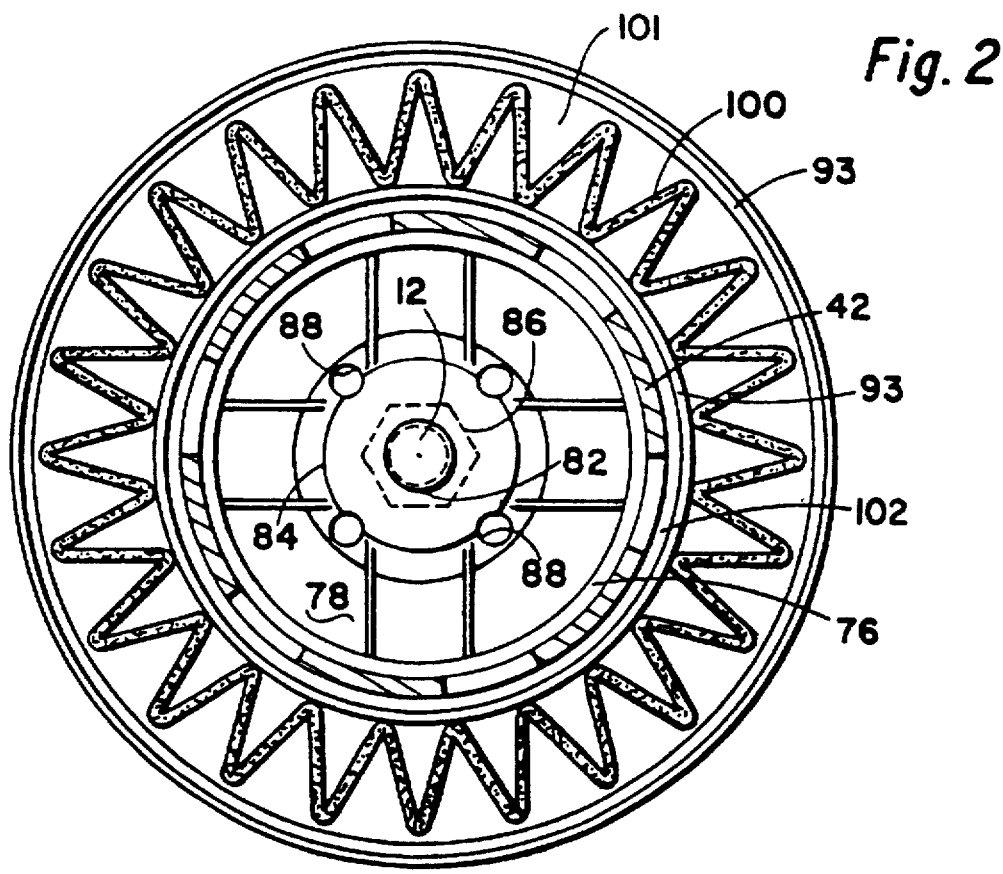
FIG. 2 is a cross-sectional view taken along line 2—2 of FIG. 1.

Top flange member 78, shown in FIGS. 1 and 2, is provided with a continuous upper end 80 that extends inwardly and is provided with a central opening 82 therethrough for receiving rod 12. Adjacent central opening 82, upper end 80 of flange member 78 forms an upwardly facing depression 84 into which a jam nut 86 is positioned when jam nut 86 is tightened onto threaded portion 20 of rod 12 in order to secure center tube assembly 30 to rod 12 and hence to filter attachment means 16.

Upwardly facing depression 84 is provided with a plurality of pressure relief openings 88 that communicate through top flange member 78 permitting liquids and gases from becoming trapped in depression 84.

Once center tube assembly 30 has been secured to rod 12 which is, in turn, attached to filter attachment means 16, a hollow pleated filter element assembly 90, having a top end 91 and a bottom end 92, is lowered around center tube assembly 30. Pleated filter element assembly 90 comprises a top ring 93 to which a top sealing gasket 94 is attached, an opposite bottom ring 96 to which a bottom sealing gasket 98 is attached, and a treated filter medium 100 extending between and in sealing engagement with top and bottom rings 93 and 96. Pleated filter element assembly 90 has an inside diameter slightly larger than the outside diameter of center tube assembly 30 and therefore slides readily thereabout. As center tube assembly 30 is secured in concentric relationship with rod 12, center tube assembly 30 and rod 12 comprise elongated filter alignment means 11 causing pleated filter element assembly 90 to be concentrically aligned with filter attachment means 16. Since filter element assembly 90 is in close fitting relationship with center tube assembly 30, filter element assembly 90 may be quickly placed or replaced as filter alignment means 11 facilitates alignment with filter attachment means 16.

Figure 4:
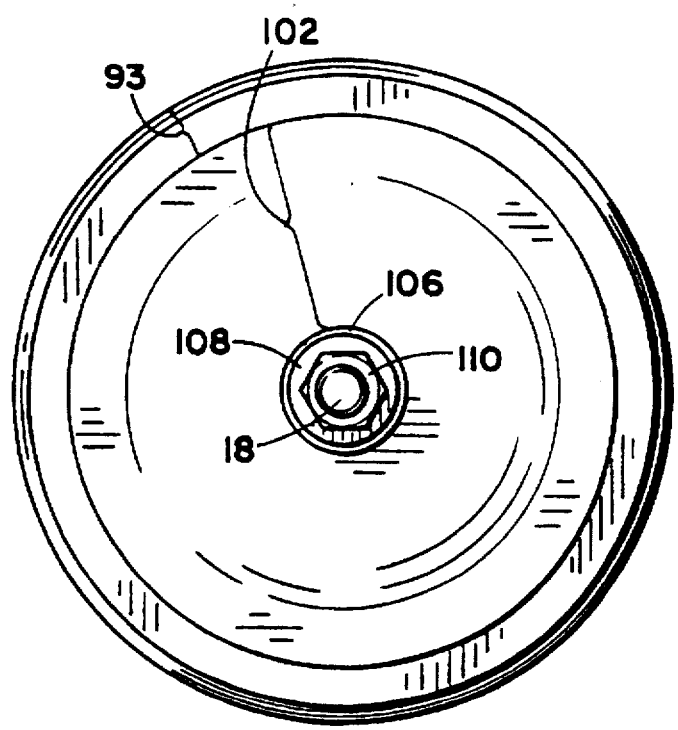
FIG. 4 is a top plan view of the filter system of FIG. 1 or FIG. 7.

As will hereinafter be described, a fluid communication path through the treated filter medium 100 is required for the filter system 10 to function. Referring now to FIGS. 1 and 4, as filter element assembly 90 is lowered into place, bottom sealing gasket 98 engages ledge 25 of filter attachment means 16. Bottom sealing gasket 98 provides a first means for establishing the fluid communication path by sealing bottom ring 96 to filter attachment means 16 at its outer peripheral ledge 25. Once filter element assembly 90 is in place, a yoke 102 provided with a central opening 104 therethrough is placed over top end 18 of rod 12 so that rod 12 extends through opening 104. Yoke 102 is then lowered onto rod 12 until its outer peripheral area 103 is adjacent top flange member 78 and in engagement with top sealing gasket 94. Top sealing gasket 94 therefore provides a second means for establishing a fluid communication path through the treated filter medium 100 by sealing top ring 93 to yoke 102 at its outer peripheral edge 103. A compressible washer 106 is next placed onto threaded portion 20 adjacent yoke 102. A second washer 108 is then placed between the compressible washer 106 and a nut 110 disposed on upper end 18 of rod 12. Nut 110 is tightened against washers 106 and 108, thus compressing top and bottom sealing gaskets 94 and 98, thereby sealing filter element assembly 90 to filter attachment means 16 on bottom end 92 and to yoke 102 on top end 91.

In use, a medium to be filtered (not illustrated) passes through pleated filter element assembly 90, then through apertured center tube assembly 30 before exiting filter assembly 10 via fluid passageway 22 of filter attachment means 16. Center tube assembly 30 supports filter element assembly 90 from collapsing, enabling it to withstand the differential pressure exerted on it by the medium to be filtered.

When filter element assembly 90 becomes clogged, flow of the medium to be filtered is discontinued in order to take the filter system 10 out of service. After filter system 10 is out of service, nut 110 is removed from rod 12 and washers 106, 108 and yoke 102 are removed. Filter element assembly 90 is then displaced axially upwardly and removed from center tube assembly 30. A fresh filter element assembly 90 is then inserted around center tube assembly 30 and yoke 102, washers 106 and 108 are replaced and nut 110 is re-tightened to seal the fresh filter element assembly 90 to filter attachment means 16 and yoke 102. As above, fresh filter element assemblies 90 are closely sized to the outside diameter of apertured center tube assembly 30 allowing simplified removal and realignment. The filter system 10 having the fresh filter element assembly 90 in place is then ready to be placed back in service. Since filter element assembly 90 does not require a non-combustible center support tube to be incorporated in filter element assembly 90, filter element assembly 90 can be made solely of combustible materials that are readily disposed of by incinerating. In this manner, the clogged, used filter element assembly 90 removed from filter system 10 may be encased in a suitable disposal container and safely removed to an incinerating facility.

Figure 7:
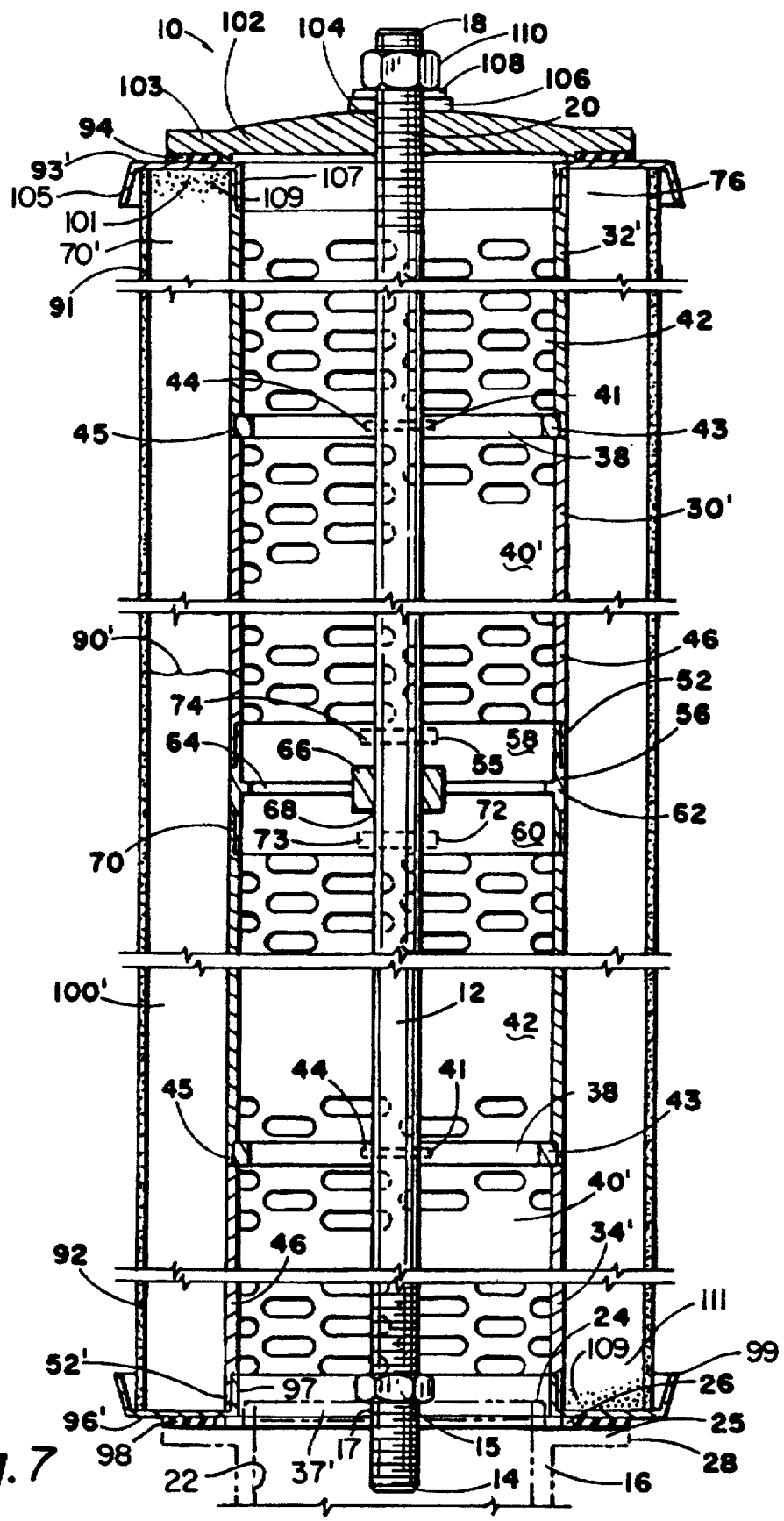
FIG. 7 is a front elevation of a filter system constructed according to an alternative embodiment of the present invention.
Figure 8:
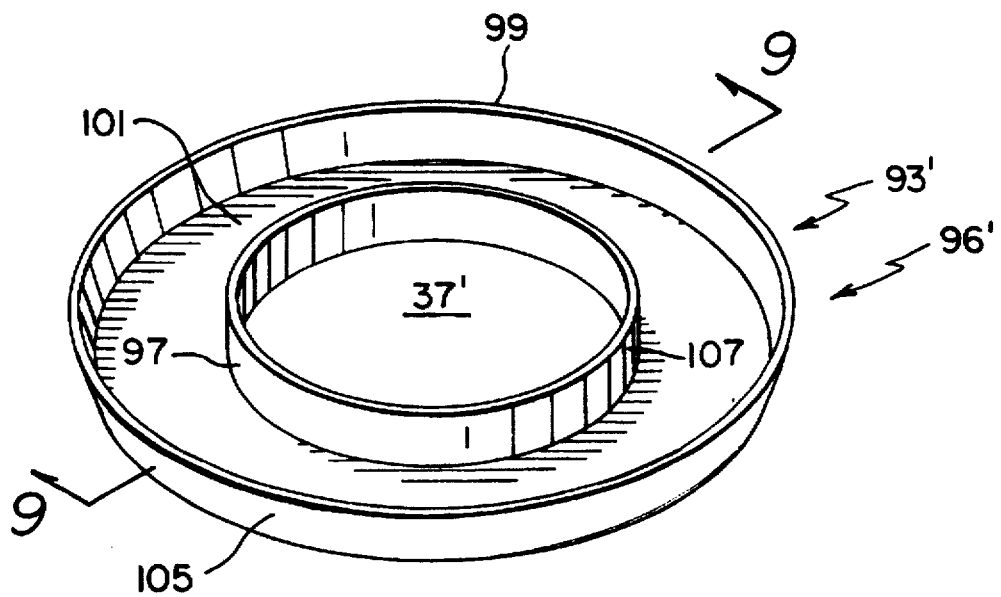
FIG. 8 is a perspective view of top or bottom flange removed from the filter system of FIG. 7.
Figure 9:
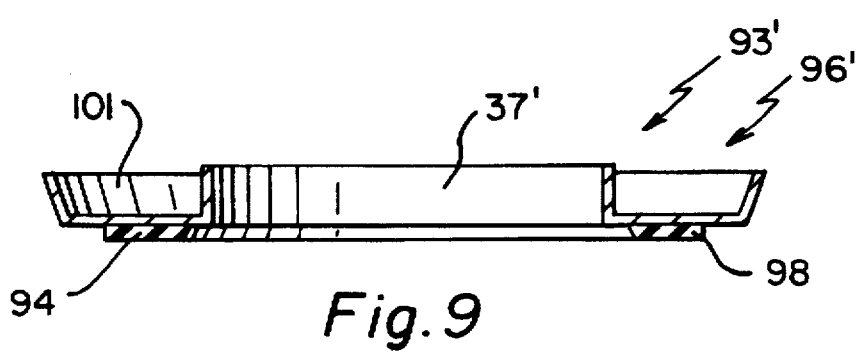
FIG. 9 is a cross sectional view of the top or bottom flange of FIG. 8.

In an alternative embodiment shown in FIG. 7 and FIG. 8, the filter system 10 is shown having an elongated apertured center tube assembly 30', a top end portion 32' and a bottom end portion 34' aligned concentrically with filter attachment means 16 and upon central rod 12 by means of elongated filter alignment means 11. Central rod 12, filter attachment means 16, yoke 102, washers 106 and 108 with nut 110 thereupon are disposed in identical relationship to filter system 10 of the preferred embodiment described above and only the details of this alternative embodiment are hereinafter described.

In this alternative embodiment elongated apertured center tube assembly 30' has treated filter medium 100' disposed therearound and held thereabout by top ring 93' and opposite bottom ring 96'. Top ring 93' is secured to center tube assembly 30' and to treated filter medium 100' by partially filling annular space 101, created between outwardly angled flange 105 and downturned inner flange 107, with an elastomeric material 109 such as a thermosetting or thermoplastic material. Such an elastomeric material is fully described in U.S. Pat. No. 2,732,031, issued on Jan. 24, 1956 to Rabbitt, et al., and is incorporated into this application by this reference thereto. Prior to filling annular space 101, downturned inner flange 107 is axially moved into frictional engagement with the internally enlarged diameter of upper end 70' of top end portion 32' and into abutting relationship with an end of treated filter medium 100'. It is readily apparent that the outside diameter of downturned inner flange 107 is substantially the same diameter as the internally enlarged diameter of upper end 70'. In like manner, bottom ring 96' is secured to center tube assembly 30' and to treated filter medium 100' by partially filling the annular space 111, created between outwardly angled flange 99 and upturned inner flange 97, with an elastomeric material 109 such as a thermosetting or thermoplastic material. Prior to filling annular space 111, upturned inner flange 97 is axially moved into frictional engagement with the internally enlarged diameter of downwardly oriented section 52' of the bottom end portion 34' and into abutting relationship with an opposite end of treated filter medium 100'. The outside diameter of upturned inner flange 97 is substantially the same diameter as the internally enlarged diameter of downwardly oriented section 52'. Top ring 93' and opposite bottom ring 96' are identical in shape and construction reducing the need for different flanges as well as avoiding confusion in assembly. Furthermore, the use of identical parts facilitates manufacture of these rings. In this embodiment, an alternative pleated filter element assembly 90' comprises elongated apertured center tube assembly 30', treated filter medium 100', top end ring 93' and bottom end ring 96' with elastomeric material 109 surrounding the ends of treated filter medium 100' and partially filling the spaces 101 and 111 of top end ring 93' and bottom end ring 96', respectively.

Center tube assembly 30' is identical to center tube assembly 30 of the preferred embodiment and it is believed that the details of construction may be readily translated to the center tube assembly 30' of FIG. 7 by referring to like components having a prime mark (') adjacent the reference number utilized above. Only the details of the changes between the preferred embodiment and this alternative embodiment are necessary for a complete understanding thereof The inside diameter of bottom ring 96' of alternative filter assembly 90' is adapted to fit closely around upwardly oriented inner retaining lip 24 but as opposite bottom ring 96' now extends into the internal diameter of lower male tube 40 and in frictional engagement with the internally enlarged diameter of downwardly oriented section 52', bottom opposite ring 96' just rests on outer retaining lip 26 when fully assembled with nut 110 fully tightened up on top end 18 of rod 12. Bottom sealing gasket 98 engages horizontally oriented ledge 25 outwardly of upwardly oriented outer retaining lip 26 in like manner to the preferred embodiment providing a first means for establishing the fluid communication path by sealing the bottom ring 96' to the filter attachment means 16 at its outer peripheral ledge 25. Once the filter assembly 90' is in place, yoke 102 provided with a central opening 104 therethrough is placed over the top end 18 of the rod 12 so that the rod 12 extends through the opening 104. The yoke 102 is then lowered on the rod 12 until its outer peripheral area 103 is adjacent the top flange member 78 and in engagement with the top sealing gasket 94. The top sealing gasket 94 therefore provides a second means for establishing a fluid communication path through the treated filter medium 100' by sealing the top ring 93' to the yoke 102 at its outer peripheral edge 103. Compressible washer 106 is next placed onto the threaded portion 20 adjacent the yoke 102 and as in the preferred embodiment second washer 108 is then placed between the compressible washer 106 and nut 110. Nut 110 is tightened against washers 106 and 108, thus compressing the top and bottom sealing gaskets 94 and 98 thereby sealing the alternative pleated filter element assembly 90' to filter attachment means 16 on the bottom end 92 and to yoke 102 on top end 91. Opposite bottom ring 96' is provided with a central opening 37' which allows fluid communication between elongated center tube assembly 30 and the fluid passageway 22 of the filter attachment means 16.

Elongated filter alignment means 11 receives alternative pleated filter element assembly 90' thereon as central rod 12 passes through each of openings 68 in each of central hubs 66 aligning pleated filter element assembly 90' with upwardly oriented inner retaining lip 24. As central rod 12 is received in multiple openings 68, alignment of alternative pleated filter element assembly 90' is further enhanced. After alignment of each of openings 68 with central rod 12, placement of yoke 102 proceeds as described above.

The method of making an elongated filter system 10 comprises the steps of providing a first elongated filter alignment means 11 comprising a vertically oriented central rod 12, having a bottom end 14, a top end 18 provided with a threaded portion 20, a nut 15, and a filter attachment means 16. Filter attachment means 16 is provided with a fluid passageway 22 and a central hole 17 formed therethrough with an upwardly oriented inner retaining lip 24 formed concentrically with central hole 17 and around fluid passageway 22. Filter attachment means 16 has a horizontally oriented ledge 25 circumferentially attached and extending outwardly from an inner retaining lip 24. An upwardly oriented outer retaining lip 26 is formed on ledge 25 of filter attachment means 16 with outer retaining lip 26 spaced radially outwardly from inner retaining lip 24 and spaced radially inwardly from an outer edge 28 of ledge 25. Annular recess 27 is formed between inner retaining lip 24 and outer retaining lip 26. Filter attachment means 16 may be formed of a metallic material by various casting methods, machining from solid or tubular stock or may be assembled of separate parts affixed together by welding. Furthermore, filter attachment means 16 need not be metallic and could be formed of other materials such as thermoplastic materials which may include reinforcing filler materials. It is understood here, that filter attachment means 16 need only be of sufficient strength to support and retain filter system 10 or 10' thereupon.

Filter alignment means 11 is preferably formed by attaching vertically oriented central rod 12 to bottom end 14 of filter attachment means 16 by threading central rod 12 into central hole 17 which has been internally threaded with mating threads and affixed thereto with nut 15. Top end 18 is threaded creating threaded portion 20 adapted to receive at least one nut 86 and/or nut 110 thereon. Central rod 12 may be formed of metallic material such as steel and is of sufficient length to accommodate the number of interlocking tube sections 38 for the proper length of filter system 10. It is understood that filter system 10 may include filter element assemblies 90 or alternative filter element assemblies 90' of greatly extended length, for instance, from about 14 inches to more than 43 inches.

In the preferred embodiment, elongated apertured center tube assembly 30 is formed of at least one upper female tube 42 and at least one lower male tube 40, the uppermost portion of the uppermost female tube 42 establishing top end portion 32 of elongated apertured center tube assembly 30, and the lowermost portion of lower male tube 40 establishing bottom end portion 34 of elongated apertured center tube assembly 30, respectively. Bottom flange member 36 is inserted into bottom end portion 34 of center tube lower end 46 and rests in annular recess 27. Bottom flange member 36 is provided with a central opening 37 which allows fluid communication between center tube assembly 30 and fluid passageway 22 of filter attachment means 16. Each of upper female tube 42, lower male tube 40 and bottom flange member 36 are formed of combustible thermoplastic materials which may include reinforcing fillers therein.

Center tube assembly 30 is composed of at least one interlocking tube section 38 which is comprised of a lower male tube 40 and an upper female tube 42 as recited above. The filter system 10 employs at least two interlocking tube sections 38 and as illustrated in FIG. 1 by the broken lines bisecting filter system 10, the present invention also includes filter systems 10 employing one or more than two interlocking tube sections 38. Tubes 40 and 42 are held together by means of at least one ear 41, and preferably two ears 41, formed on upper end 43 of each of lower male tubes 40 that engage corresponding openings 44 formed in lower end 45 of each of female tubes 42.

The lower end 46 of lowermost male tube 40 serves as bottom end 34 of center tube assembly 30 and, as such, is secured to an upper end 48 of bottom flange member 36. As best seen in FIGS. 1, 5 and 6, upper end 48 of bottom flange member 36 has an upwardly oriented section 50 of decreased external diameter mating to lower end 46 of lower male tube 40 within downwardly oriented section 52 of increased internal diameter so that upwardly oriented section 50 is telescopically received in downwardly oriented section 52. Upwardly oriented section 50 has at least one ear 54, shown in FIGS. 5 and 6, adapted to engage at least one corresponding opening 55 (visible in the upper most tube section 38 in FIG. 1) formed in downwardly oriented section 52 in order to secure bottom end 34 of central tube assembly 30 to bottom flange member 36.

As illustrated in FIG. 1, two or more tube sections 38 may be attached in an end-to-end relationship to form elongated center tube assembly 30 by connecting intermediate connecting members 56 between each of tube sections 38. Each of intermediate connecting members 56 has an upwardly oriented upper end 58 of decreased external diameter, a downwardly oriented lower end 60 of decreased external diameter, the decreased external diameters being relative to a middle portion 62. The circumferential flange portion formed between ends 58 and 60 comprises middle portion 62 which has an external diameter substantially equal to the outside diameter of each of interconnecting tube sections 58. Referring also to FIG. 3, middle portion 62 has inwardly oriented spokes 64 formed on an internal portion thereof which are attached to central hub 66. The central hub 66 has an opening 68 formed therethrough for receiving rod 12 aligning each of middle portions 62 in concentric relationship with rod 12.

Lower ends 60 are telescopically received within increased internal diameter of upper end 70 of each of female tubes 42 of interlocking tube section 38. Each of upper ends 70 has openings 72 formed therein for receiving corresponding ears 73 formed on each of lower ends 60. When assembled in end-to-end relationship, ears 73 received in openings 72 secure intermediate connecting member 56 to tube section 38 located immediately below intermediate connecting member 56.

Likewise, each of upper ends 58 has a decreased external diameter telescopically receiving downwardly oriented sections 52 of lower ends 46 of male tube 40 in the tube section 38 located immediately above. Similarly, each of upper ends 58 has at least one ear 74 formed thereon adapted to engage at least one opening 55 formed in downwardly oriented sections 52 of male tube 40 of the tube section 38 located immediately above. Therefore, when assembled in end-to-end relationship ears 74 received in openings 55 secure together intermediate connecting member 56 and tube section 38 immediately above.

In the preferred embodiment, a top flange member 78 has a lower end 76 having a reduced external diameter which is telescopically received in upper end 70 of female tube 42 located in the upper most tube section 38 of filter system 10. Top flange member 78 does not have any ears formed thereon for engaging openings 72 and may be removably secured to center tube assembly 30. Top flange member 78, shown in FIGS. 1 and 2, has a continuous upper end 80 that extends inwardly and has a central opening 82 formed therethrough for receiving rod 12. Adjacent central opening 82, an upwardly facing depression 84 is formed into upper end 80 of flange member 78 providing means for receiving a jam nut 86 to be tightened onto threaded portion 20 of rod 12 in order to secure center tube assembly 30 to rod 12 and hence to filter attachment means 16.

Upwardly facing depression 84 is provided with a plurality of pressure relief openings 88 that communicate through top flange member 78 that permit liquids and gases from becoming trapped in depression 84. Top flange member 78 may be formed of the same materials and by the same methods as filter attachment means 16 but preferably is molded from the same thermoset or thermoplastic material as interlocking tube sections 38 and intermediate connecting members 56.

Pleated filter element assembly 90, having a top end 91 and a bottom end 92, comprises a top ring 93 having top sealing gasket 94 attached thereto, an opposite bottom ring 96 having bottom sealing gasket 98 attached thereto, and a treated filter medium 100 extending between and in sealing engagement with top and bottom rings 93 and 96. Pleated filter element assembly 90 has an inside diameter slightly larger than the outside diameter of center tube assembly 30 adapted to slide readily thereabout. Treated filter medium 100 is formed into a right circular cylinder of proper height and placed into abutting relationship with and between top ring 93 and opposite bottom ring 96. Top ring 93 is secured to treated filter medium 100 by partially filling an annular space 101, created between outwardly angled flange 105 and downturned inner flange 107, with an elastomeric material 109 such as a thermosetting or thermoplastic material. In like manner, bottom ring 96 is secured to treated filter medium 100 by partially filling an annular space 111, created between outwardly angled flange 99 and upturned inner flange 97, with an elastomeric material 109 such as a thermosetting or thermoplastic material. Top ring 93 and opposite bottom ring 96 are identical is shape and construction reducing the need for different flanges as well as avoiding confusion in assembly. Furthermore, the single part facilitates manufacture of these rings. In this preferred embodiment, pleated filter element assembly 90 comprises treated filter medium 100, top end ring 93 and bottom end ring 96 with elastomeric material 109 partially filling spaces 101 and 111 of top end ring 93 and bottom end ring 96 and surrounding the ends of treated filter medium 100.

Yoke 102 has a central opening 104 formed therein for receiving top end 18 of rod 12. Yoke 102 has outer peripheral area 103 formed on one side thereof substantially of the same or larger diameter as gaskets 98 and 94 of pleated filter element assembly 90. Yoke 102 is of sufficient thickness to withstand the axial force required to secure pleated filter assembly to filter attachment means 16. Yoke 102 may be domed as shown in FIG. 1 or FIG. 7. Yoke 102 may be formed of the same materials and the same methods as filter attachment means 16 or top flange member 78 but preferably is molded from the same thermoset or thermoplastic material as interlocking tube sections 38 and intermediate connecting members 56.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

I claim:

1. An elongated filter system comprising an elongated filter alignment means, a filter attachment means and an elongated filter means, said elongated filter alignment means being in the form of a central rod removably attached to said filter attachment means, said elongated filter alignment means having means on one end to secure said elongated filter means thereupon in fluid communication with a fluid passageway disposed in said filter attachment means, a yoke secured by said filter alignment means having an outer peripheral area adapted to be in sealing engagement with said filter means, said elongated filter system further including an elongated aperatured center tube assembly having a central opening in a central hub of at least one of a series of interlocking tube sections, each of said central openings being aligned with said filter alignment means, said elongated aperatured center tube assembly having said filter means disposed thereabout, and wherein said elongated aperatured center tube assembly is separate from said filter means, said filter means being disposed about said center tube assembly.

2. An elongated filter system as describe in claim 1 wherein said elongated aperture center tube assembly is secured to said filtering means and is removable therewith.

3. An elongated filter system as described in claim 1 wherein said elongated filter means is in the form of an elongated pleated filter element assembly removably disposed about said elongated aperatured center tube assembly.

4. An elongated filter system as described in claim 3 wherein said elongated pleated filter element assembly is removably secured by said yoke disposed upon one end of said central rod and wherein said yoke is in sealing engagement with one end of said elongated pleated filter element assembly.

5. An elongated filter system as described in claim 4 wherein said yoke is in sealing engagement with a top ring secured to said one end of said elongated pleated filter element assembly.

6. An elongated filter system as described in claim 4 wherein said elongated pleated filter element includes a top ring secured to said one end and a gasket disposed upon said top ring and said yoke is in sealing engagement with said gasket.

* * * * *